Figures 1, 2, 3:
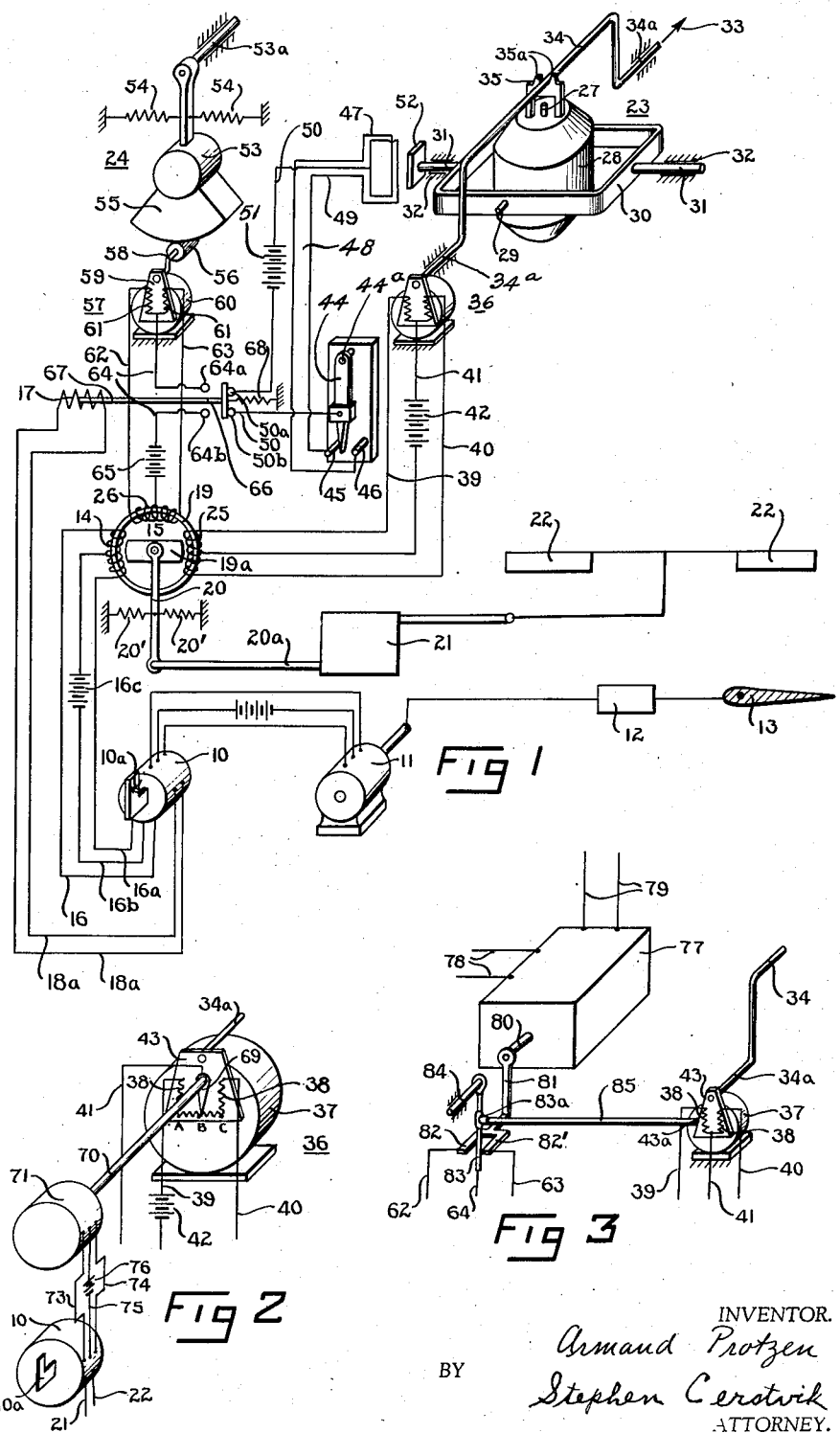

June 20, 1939.  A. PROTZEN  2,162,862

ATTITUDE CONTROL MEANS FOR AIRCRAFT

Filed May 20, 1938

INVENTOR.
Armand Protzen
BY Stephen Cerotvik
ATTORNEY.

Patented June 20, 1939

2,162,862

UNITED STATES PATENT OFFICE 2,162,862

ATTITUDE CONTROL MEANS FOR AIRCRAFT

Armand Protzen, Berlin-Spandau, Germany, assignor to Siemens Apparate und Maschinen Gesellschaft mit beschränkter Haftung, Berlin, Germany Application May 20, 1938, Serial No. 209,117
In Germany May 22, 1937

8 Claims. (Cl. 244—77)

This invention relates to attitude control means for aircraft, and more particularly to means for controlling an aircraft following a curved flight path.

One of the objects of the present invention is to provide novel means for governing the attitude of an aircraft in curved flight whereby the craft will assume the proper banking angles.

A further object of the invention is to provide novel means for governing the control surfaces of an aircraft whereby, for curved flight, the ailerons are automatically actuated simultaneously with the rudder.

Another object is to provide novel means of the above character wherein a direction transmitter positions a rubber, and in association therewith, an artificial horizon positions suitable ailerons.

A further object is to provide novel means of the above character wherein, during a curved flight, the ailerons of an aircraft are initially adjusted by the combined action of a course control member and an artificial horizon, and are finally adjusted by the action of means which are responsive to the relative position of the apparent vertical and the vertical axis of the aircraft.

Another object is to provide novel means for controlling the attitude of an aircraft in curved flight, said means being governed by manually controlled means.

An additional object is to provide novel means of the above character whereby the vertical axis of an aircraft may be quickly and automatically brought into coincidence with the apparent vertical while banking in a curved flight path.

Another object is to provide novel means of the above character whereby the skidding of an aircraft while making a turn is reduced to a minimum.

The above and further objects and novel features will more fully appear from the following detailed description when the same is read in connection with the accompanying drawing. It is to be expressly understood, however, that the drawing is for purposes of illustration only and not intended as a definition of the limits of the invention, reference for this latter purpose being had to the appended claims.

In the drawing, wherein like reference characters refer to like parts throughout the several views, Fig. 1 is a schematic diagram of one embodiment of the invention;

Fig. 2 is a schematic diagram of a device for controlling the flow of current to a coil which may be employed in the present invention; and, Fig. 3 is a schematic diagram of an inclination transmitting device which may be employed in the present invention.

The form of the invention illustrated, by way of example, is a device for controlling the attitude of an aircraft while following a curved flight path whereby the vertical axis of the aircraft may be brought into the proper angular relation with the apparent vertical. The device is constituted by a course control member which may comprise a hand-controlled electric switch which governs suitable means for positioning a course rudder and also governs the current flowing to a rotary magnet which by suitable amplifying means positions the ailerons of the aircraft. An artificial horizon, for example, of the gyroscopic type, operatively connected to said rotary magnet by a second coil which is energized when transverse inclinations occur, neutralizes the action of the first coil and the course control member upon said rotary magnet, whereupon means which are responsive to the relative angular position of the apparent vertical and the vertical axis of the craft further adjust the ailerons to bring said craft into the proper banking angle.

In the form shown in Fig. 1, novel means are provided for governing the apparatus comprising a switch member 10 having, for example, a hand knob 10a. Switch 10 is operatively connected to a servo-motor 11 which, by adjusting a gyro compass 12 positions by suitable means (not shown) associated therewith a course rudder 13. Switch 10 controls both the direction and speed of rotation of motor 11 and further is connected to a stator coil 14 of a rotary magnet 15 by means of leads 16, 16a and 16b, the latter lead being connected through an energy source 16c whereby said switch, depending upon the direction in which it is moved from a centralized position, controls the direction of the field of said coil, the field being of constant strength. For a purpose to later appear, a solenoid 17 by means of leads 18a, 18a is also connected to switch 10 and is energized upon a movement of the switch from the central position. Rotary magnet 15 comprises a control element for a servo-motor, said magnet being constituted by a conventional stator 19 and armature 19a, the latter being attached to an arm 20 which is operatively connected by means of a rod 20a, to a servo-motor 21 which positions ailerons 22, 22. Arm 20 is normally held in a centralized position by means of opposed springs 20', 20'.

In cooperation with the switch member 10 controlling coil 14 which has a constant field strength independent of the displacement of knob 10a, two additional members influence coils upon the rotary magnet, and hence the ailerons, said members comprising an artificial gyroscopic horizon 23 and a banking acceleration indicator 24, to be later explained, which respectively control the current to a pair of coils 25 and 26 upon said stator. The former member is constituted by a gyro rotor (not shown) having a shaft 27 which is mounted in a housing 28 having trunnions 29, 29 which are supported in a conventional gimbal ring 30 having trunnions 31, 31 resting in bearings 32, 32. The axis of trunnions 29, 29 is parallel to the longitudinal axis of the craft as indicated by arrow 33 when the gyroscopic plane of rotation is in the horizontal. Also parallel to said longitudinal axis are the shaft portions 34a, 34a of a crank 34 which is operatively connected to gyro housing 28 by means of an upwardly extending member 35 upon the top thereof, having fingers 35a, 35a between which the crank 34 is slidably held whereby any angular displacement of the housing 28 about trunnions 29, 29, i. e., transverse displacement, is transmitted to said crank and to a current control device for coil 25. The current control device comprises a conventional bolometer 36 having a nozzle portion 37 and double coils or resistance 38, 38 in bridge connection by means of leads 39, 40, 41 with coil 25, the latter lead being connected to said coil through a suitable energy source 42. The field strength of coil 25 is selected to equal that of coil 14 when said bridge connection is unbalanced. The air jet from nozzle portion 37 is normally prevented from reaching either of the coils 38, 38 by means of a plate or diaphragm 43 which is interposed therebetween and positioned by the gyroscopic horizon, being operatively connected to shaft 34a and adapted for angular displacement therewith.

Suitable means which, for a reason to later appear, are effective only when switch 10 is centralized, are provided for controlling transverse inclinations of the craft in association with horizon 23. The means are constituted by a pendulum 44 pivotally mounted upon a shaft 44a which is axially parallel to shafts 34a, 34a and trunnions 29, 29. Pendulum 44 moves between two electric contacts 45, 46 which are connected to opposite extremities of a coil 47 by leads 48, 49. The center of said coil 50, by a lead 50, is connected to said pendulum through contacts 50a and 50b of a switch to be later described and through an energy source 51. Coil 47 is placed adjacent a permanent magnet 52 which is rigidly attached to one of the trunnions 31, 31 whereby a turning moment is produced upon said magnet when the coil 47 is energized, the direction of said moment being dependent upon which of the contacts 45 or 46 is engaged by pendulum 44.

The above-mentioned banking acceleration indicator 24 which, by controlling coil 26, aids in positioning the ailerons is responsive to angular differences between the vertical axis of the aircraft and the apparent vertical while in curved flight and is constituted by a pendulum 53 pivotally mounted upon a shaft 53a which is axially parallel to the longitudinal axis of the craft. Pendulum 53 is normally held in a centralized position by opposed springs 54, 54 and is provided at the lower extremity thereof with a toothed sector 55 which meshes with a suitable gear 56 operatively connected to a bolometer 57 by means of a rod 58 which positions a diaphragm 59 of said bolometer and thus normally is interposed between an air nozzle 60 and a pair of double resistances or coils 61, 61 which by leads 62, 63 and 64 are in conventional bridge connection with coil 26. Lead 64 is connected through an energy source 65 to said coil.

In order that the banking acceleration indicator may be of high sensitiveness, the gear ratio between sector 55 and spur gear 56 should be high. The springs 54, 54 which normally centralize the pendulum should be in high tension whereby a high natural frequency of the pendulum is obtained, thus increasing the accuracy of the apparatus.

In order to avoid the effect upon the apparatus of disturbing precessional movements of the gyroscopic horizon while the aircraft is in curved flight, a switch 66 is provided for disconnecting pendulum 44, said switch having a rod 67 attached thereto which extends into the solenoid 17. The switch 66 normally engages the above-mentioned contacts 50a and 50b in the circuit of pendulum 44, being held thereagainst by a spring 68. A second pair of contacts 64a and 64b in lead 64 is provided adjacent thereto, the latter two contacts being interconnected by switch 66 when solenoid 17 is energized and rod 67 withdrawn against the pressure of spring 68.

In operation, if it is desired to make a change of course the hand knob 10a of switch 10 is angularly displaced to the right or left from the central position, as the case may be, by an amount corresponding to the speed at which it is desired to move rudder 13. Several reactions occur simultaneously when this displacement is made, namely, motor 11 rotates to move rudder 13, coil 14 exerts a turning moment upon the armature 19a of the rotary magnet, thus deflecting the ailerons, solenoid 17 is energized withdrawing switch 66 from its normal position against contacts 50a and 50b to a second position connecting contacts 64a and 64b. The deflection of the rudder and the ailerons from their normal central positions will, in turn, produce simultaneously a turn about the vertical and longitudinal aircraft axes. The resulting transverse inclination of the craft in the curved flight path will cause air nozzle 37 to be displaced relative to diaphragm 43, the latter being held in the true vertical by artificial horizon 23. An air jet from said nozzle will be directed upon one of the coils 38, 38 altering the resistance thereof and unbalancing the bridge circuit, of which it is a part, thus unbalancing the field of coil 25 and causing the same to neutralize the motor action of coil 14 upon armature 19a whereby the arm 20 returns to its initial central position. From this point on, while switch 10 is displaced, the banking accelerator indicator influences the rotary magnet by means of coil 26, the operative connection of said indicator and coil being initially completed when switch 66 engaged contacts 64a and 64b as above mentioned. The banking indicator will not be deflected from its central position so long as the vertical aircraft axis and the apparent vertical are in the proper angular relation, i. e., in most aircraft, in coincidence. This is because the centrifugal forces acting, when said proper angular relation exists, will maintain the pendulum 53 in the central position. However, if the vertical aircraft axis moves away from the apparent vertical when in curved flight, due, for example, to insufficient transverse inclination as produced by aileron displacement, a "skidding" in the turn will occur which will permit centrifugal force to deflect said pendulum. This "skidding" is referred to as a banking acceleration and always occurs when improper transverse inclination exists. The deflection of the pendulum against the pressure of springs 54, 54 will displace diaphragm 59 of bolometer 57 and in a manner analogous to that of bolometer 36 unbalance the field of coil 26 by an amount which is a function of the angular discrepancy between the apparent vertical and the vertical aircraft axis. Consequently, the field strength of coil 26 will be a similar function and armature 19a of rotary magnet 15 will be accordingly displaced to further deflect ailerons 22 to bring the craft to the proper transverse inclination whereby the vertical aircraft axis and the apparent vertical are brought into coincidence. When the desired course change has been made the knob 10a is returned to its initial position, coil 14, solenoid 17, and motor 11 are deenergized. The switch 66 is moved by draw spring 68 into engagement with contacts 50a, 50b, thus completing the operative connection of pendulum 44 to the artificial horizon. The ailerons now will be readjusted by the gyroscopic horizon to reduce the transverse inclination to zero and restore the craft to a horizontal position in a manner known per se.

In accordance with the explanation made above, the initial excitation of the rotary magnet is caused by means of a coil 14 on the stator of said magnet. It is not necessary, however, that this initial excitation be effected by a coil in this manner; for example, coil 14 may be eliminated and the same result obtained by connecting an added resistance to either of the coils 38, 38 when knob 10a is turned from the central position. One form of this construction is illustrated in Fig. 2 wherein a bolometer 36 is employed similar to that of Fig. 1 with the exception that an added resistance AC is connected between coils 38, 38. An arm 69 mounted upon shaft 70 is positioned either at a central point B on said resistance or at either extremity thereof, depending upon whether switch member 10 is in a central position or displaced to the right or left. Shaft 70 is operatively connected to switch member 10, for example, by a relay 71 having leads 73, 74 and 75, the latter having an energy source 76 therein.

The operation of this embodiment is similar to that shown in Fig. 1, with the exception that the motor action of rotary magnet 15 is initially produced by coil 25 in the following manner. When flying upon a straight course, the knob 10a and arm 69 are in central positions, equal currents flow in the coils 38, 38, and the bridge circuit is balanced. However, if the course control knob 10a is moved, for example, to the right the arm 69 will be deflected from its central position to point C and the bridge circuit will be unbalanced causing coil 25 to exert a turning moment upon armature 19a which will, by means of servo-motor 21, deflect ailerons 22. The craft will therefore be transversely inclined whereby nozzle 37 will move relative to diaphragm 43 to direct an air jet upon the coil 38 which is adjacent to point A of resistance AC. The resistance AC is selected such that when the diaphragm 43 is displaced under these conditions the air jet reduces the resistance of the exposed coil 38 to the point where equal currents flow on both sides of the bridge, thus balancing the bridge and reducing the motor action of coil 25 to zero. The ailerons will be further positioned by the banking acceleration indicator 24 in the manner above described. When the desired course change has been made knob 10a is recentralized, arm 69 moves to central point B on resistance AC, the bridge circuit of bolometer 36 is unbalanced, coil 26 is disconnected and coil 25 exerts a turning moment upon the armature to recentralize the ailerons and reduce the transverse inclination to zero. The diaphragm 43 is again interposed between the air jets of nozzle 37 and the coils 38, 38 and the bridge connection is rebalanced. The craft is thus restored to its original attitude upon a different course.

The banking acceleration indicator 24 employed in Fig. 1 which is responsive to angular differences between the aircraft's vertical axis and the apparent vertical, may be replaced by any other type of banking indicator, for example, by a pendulum or by a device which determines the angle between the true and apparent verticals by the product of the angular velocity of the aircraft about its vertical axis and the air speed. Since the angular velocity of the aircraft about its vertical axis is proportional to the velocity by which the adjustment of the base, that is, the control zero position of the gyro compass is effected by the motor 11, it is determined in a most simple manner by the velocity (R. P. M.) of the motor 11. In the form of this device shown in Fig. 3, a multiplier 77 is represented schematically. An electric impulse proportional to the speed of motor 11 is conducted to multiplier 77 via leads 78, 78 and therein multiplied with an impulse proportional to the air speed conducted over leads 79, 79. The former impulse may be obtained from the field of said motor and the latter from a suitable air speed indicator controlling an electric current. A shaft 80 extending from the multiplying mechanism positions an arm 81 attached thereto. Arm 81 is provided at the extremities thereof with a bifurcated portion having fingers 82, 82' at right angles to the arm. Between said fingers and normally centered in spaced relation therebetween is a rod 83 pivotally mounted upon a shaft 84 coaxial with shaft 80. Rod 83 is operatively connected to the artificial horizon 23, whereby it is normally held in the true vertical, by means of an arm 85 which is pivotally connected to the rod at 83a and with diaphragm 43, of said horizon, at 43a. The fingers 82, 82' and the rod 83 are connected to coil 26 of rotary magnet 15 by leads 62, 63, 64, respectively, in a manner similar to that in which the coils 61, 61 are connected to coil 26 in Fig. 1.

In the operation of this banking indicator the arm 81 is positioned by the air speed, the angular velocity of motor 11, and by the aircraft itself since the multiplier is mounted on the craft. So long as the vertical axis of the craft coincides with the apparent vertical when in a curved flight, the arm 83 will be in the true vertical, the rod 83 is centered between fingers 82, 82', and no current flows to coil 26 to influence the ailerons 21. However, if the vertical axis of the craft moves away from the apparent vertical, the arm 81 will be deflected from the true vertical in response thereto, and rod 83 will contact either finger 82 or 82' as the case may be, thus energizing coil 26 to move armature 19a and thus to deflect ailerons 22 to compensate for the angular discrepancy between said apparent vertical and the aircraft's vertical axis. The operation of the remainder of the apparatus is similar to that described for Fig. 1.

There is thus provided a novel attitude control apparatus which accurately controls the transverse inclination of an aircraft while in curved flight whereby the craft's vertical axis is held in a proper angular relation to the apparent vertical, thus preventing "skidding" while in curved flight. The apparatus quickly causes the craft to assume the proper attitude by simultaneously deflecting the course control rudder and the ailerons.

Although only three embodiments of the present invention have been illustrated and described in detail, it is to be expressely understood that the invention is not limited thereto. For example, instead of an electrically controlled rotary magnet 15, a suitable hydraulically controlled servomotor may be employed to position the ailerons by a direct connection or, as shown, by positioning the control rod 20a of a servo-motor 20. Various changes may also be made in the design and arrangement of the parts without departing from the spirit and scope of the invention, as the same will now be understood by those skilled in the art. For a definition of the limits of the invention, reference will be had primarily to the appended claims.

What is claimed is:

1. In apparatus of the class described, an artificial horizon, a control surface for governing the course of a vehicle, control surfaces for governing the transverse inclination of said vehicle, power means for moving the first-named surface, power means for actuating the second-named surfaces, and means for simultaneously actuating said power means, without influencing said horizon.

2. In an attitude control apparatus for aircraft, a course control surface having power means operatively connected thereto, ailerons having power means operatively connected thereto, a control element for said last-named power means, speed control means for said first-named power means, means for displacing said control element simultaneously with the actuation of said speed control means, means for returning said control element in response to a predetermined transverse inclination, and means for further displacing said control element in response to angular deviations of the apparent vertical and the vertical axis of said aircraft.

3. In an attitude control apparatus for aircraft, a course control surface, power means therefor, transverse inclination control surfaces, power means therefor, a control element for said last-named power means, speed control means for said first-named power means, means for exerting a force of constant magnitude upon said control element, said last-named means being effective when said course control surface power means are energized, means effective on reaching a predetermined transverse inclination for counteracting the effect of said force upon said control element, and means responsive to angular discrepancies between an apparent vertical and a vertical axis of said aircraft for moving said control element.

4. In an attitude control device for aircraft, a course control surface, power means therefor, transverse inclination control surfaces, power means therefor, a control element for said last-named power means, speed control means for said first-named power means, means for exerting a force of constant magnitude upon said control element, an artificial horizon having transverse inclination control means associated therewith, a banking acceleration indicator, said artificial horizon being operatively connected to said control element, and means for rendering ineffective said transverse inclination control means and for operatively connecting said indicator to said element, said means being effective when said course control surface power means are energized.

5. The combination with a course rudder and transverse inclination control surfaces for an aircraft of means for determining a true vertical, means for determining the deviation of a vertical axis of said aircraft from an apparent vertical, said means being effective when in curved flight, power means for said course rudder, power means for said transverse inclination control surfaces, a control element for said last-named power means, means for producing a controlled impulse to said control element, means for producing an impulse in response to a deviation of said vertical axis from said true vertical, means for producing an impulse in response to a deviation of said vertical axis from said apparent vertical, said impulses acting upon said control element whereby said element is actuated in response to the sum of said impulses, and means including said controlled impulse means for energizing said course rudder power means when said first-named impulse is acting.

6. The combination with a course rudder and transverse inclination control surfaces for an aircraft of means for determining a true vertical, means controlled by movement of the craft and responsive to the angular velocity of said craft about the vertical axis thereof and to the air speed thereof for determining the angular relation of the apparent and true verticals, said last-named means establishing a true vertical when a vertical axis of said craft coincides with said apparent vertical, means for comparing indications of said first-named and second-named means, and means for governing said transverse inclination control surfaces in accordance with the difference between the compared indications.

7. In an attitude control device for aircraft, a course control surface, transverse inclination control surfaces, power means for said course control and transverse inclination surfaces, an artificial horizon having transverse inclination control means associated therewith, a banking acceleration indicator, a control element for said transverse inclination power means, and means for rendering ineffective said transverse inclination control means and for operatively connecting said indicator to said element, said means being effective when said course control surface power means are energized.

8. In an attitude control apparatus for aircraft, a course control surface, transverse inclination control surfaces, power means for said surfaces, and a control element for said power means comprising an electrical circuit including variable resistance, means for varying said resistance in proportion to the transverse inclination of said craft for controlling said transverse inclination power means, and manually operated means for varying said resistance whereby said course power means are controlled.

ARMAND PROTZEN.